US009976193B2

(12) United States Patent
Kerr et al.

(10) Patent No.: US 9,976,193 B2
(45) Date of Patent: May 22, 2018

(54) PURIFICATION PROCESSES

(71) Applicant: T&L Sugars Limited, London (GB)

(72) Inventors: John Kerr, London (GB); Anthony Baiada, London (GB)

(73) Assignee: T&L SUGARS LIMITED, London (GB)

( * ) Notice: Subject to any disclaimer, the term of this patent is extended or adjusted under 35 U.S.C. 154(b) by 0 days. days.

(21) Appl. No.: 15/107,040

(22) PCT Filed: Dec. 19, 2014

(86) PCT No.: PCT/GB2014/053777
§ 371 (c)(1),
(2) Date: Jun. 21, 2016

(87) PCT Pub. No.: WO2015/097455
PCT Pub. Date: Jul. 2, 2015

(65) Prior Publication Data

US 2016/0333429 A1 Nov. 17, 2016

(30) Foreign Application Priority Data

Dec. 23, 2013 (GB) .................................. 1322942.2

(51) Int. Cl.
*C13B 20/00* (2011.01)
*C02F 1/24* (2006.01)
(Continued)

(52) U.S. Cl.
CPC .............. *C13B 20/007* (2013.01); *C02F 1/24* (2013.01); *C02F 1/5236* (2013.01); *C02F 1/66* (2013.01);
(Continued)

(58) Field of Classification Search
None
See application file for complete search history.

(56) References Cited

U.S. PATENT DOCUMENTS 2,977,253 A 3/1961 Rene
3,166,442 A * 1/1965 Duke .................... C13B 20/005
127/48
(Continued)

FOREIGN PATENT DOCUMENTS

CN 1912143 A 2/2007
CN 101280344 A 10/2008
(Continued)

OTHER PUBLICATIONS

Gale et al, effect of solids recirculation of purification of raw juices, journal of the A.S.S.B.T, vol. 12, No. 5 (Year: 1963).*
(Continued)

*Primary Examiner* — Melvin C. Mayes
*Assistant Examiner* — Stefanie J Cohen
(74) *Attorney, Agent, or Firm* — Ballard Spahr LLP

(57) ABSTRACT

A process for the removal of contaminants from a liquor, including two or more of carbonatation, phosphatation and sulphitation of the liquor to form a precipitate having at least some of the contaminants from the liquor, and separating the precipitate from the liquor. The processes may be included in sugar refining or water decontamination processes.

28 Claims, 8 Drawing Sheets

| **Example 5** | | | | | **Cations (ppm on solids basis)** | | | | | | | | |
|---|---|---|---|---|---|---|---|---|---|---|---|---|---|
| | DS% | pH | Colour (ICUMSA) | Colour Removal (%) | Ca | Cu | Fe | K | Mg | Mn | Na | P | S |
| Feed Stock | 68.0 | 7.3 | 1326 | | 247 | 0 | 4 | 210 | 35 | 1 | 21 | 11 | 22 |
| Final Product | 67.0 | 8.2 | 596 | **55%** | 343 | Not Detected | 6 | 208 | 24 | 0 | 25 | 4 | Not Detected |

| **Example 5** | **Anions & acids (ppm on solids basis)** | | | | | | | | | | | **Sugars (as % on solids)** | | |
|---|---|---|---|---|---|---|---|---|---|---|---|---|---|---|
| | Chloride | Sulphate | Phosphate | Oxalate | Citrate | Aconitate | Lactate | Acetate | Malate | Formate | Nitrate | Sucrose | Glucose | Fructose |
| Feed Stock | 122 | 120 | 18 | 59 | 34 | 257 | 307 | 76 | 24 | 50 | 16 | 97.6 | 0.4 | 0.3 |
| Final Product | 124 | 45 | 6 | 51 | Not Detected | 19 | 620 | 146 | 6 | 109 | 22 | 97.7 | 0.4 | 0.3 |

(51) Int. Cl.

| | |
|---|---|
| ***C02F 1/52*** | (2006.01) |
| ***C02F 1/66*** | (2006.01) |
| ***C13B 20/10*** | (2011.01) |
| *C02F 1/42* | (2006.01) |
| *C02F 5/06* | (2006.01) |
| *C02F 103/32* | (2006.01) |

(52) U.S. Cl.

CPC ................ *C13B 20/10* (2013.01); *C02F 1/42* (2013.01); *C02F 5/06* (2013.01); *C02F 2103/32* (2013.01); *C02F 2303/16* (2013.01); *C02F 2305/04* (2013.01); *Y02P 40/44* (2015.11)

(56) References Cited

U.S. PATENT DOCUMENTS

| | | | | |
|---|---|---|---|---|
| 3,698,951 | A | 10/1972 | Bennett | |
| 3,853,616 | A | 12/1974 | Rundell et al. | |
| 3,909,287 | A | 9/1975 | Rundell et al. | |
| 2012/0216799 | A1 | 8/2012 | Bolanos | |
| 2013/0183526 | A1 * | 7/2013 | Bracilovic | C22B 26/10 428/402 |

FOREIGN PATENT DOCUMENTS

| | | | |
|---|---|---|---|
| CN | 101358250 | A | 2/2009 |
| GB | 191401576 | A | 1/1915 |
| JP | S59-28499 | A | 2/1984 |
| WO | WO-99/55918 | A2 | 11/1999 |
| WO | WO-01/14596 | A1 | 3/2001 |

OTHER PUBLICATIONS

Combined Search and Examination Report under Sections 17 and 18(3) mailed by the IP Office of Britain dated Jan. 30, 2014 for application GB 1322942.2 (8 pages).

Combined Search and Examination Report under Sections 17 and 18(3) mailed by the IP Office of Britain dated May 29, 2015 for application GB 1422704.5 (8 pages).

International Search Report and Written Opinion dated Jun. 16, 2015 for application PCT/GB2014/053777, filed on Dec. 19, 2014 and published as WO 2015/097455 (Applicant—T&L Sugars Limited // Inventors—Kerr, et al.) (18 pages).

International Preliminary Report on Patentability dated Apr. 5, 2016 for application PCT/GB2014/053777, filed on Dec. 19, 2014 and published as WO 2015/097455 (Applicant—T&L Sugars Limited // Inventors—Kerr, et al.) (25 pages).

Fok Hon-Jun, “Flotation-clarification in sugar refining. Part I”, vol. 91 (1989), issue 1088 of the International Sugar Journal (3 pages).

Fok Hon-Jun, “Flotation-clarification in sugar refining. Part II”, vol. 92 (1990), issue 1087 of the International Sugar Journal (6 pages).

Poel, et al., “Sulifiation in beet sugar manufacture,” Jan. 1, 1998 Sugar Technology: Beet and Cane Sugar Manufacture, pp. 513-519.

Schiweck, “Zucker, Rueben, und Rohr-”, Ullmanns Encyklopaedie der Technischen Chemie, vol. 24, No. 4, (Dec. 31, 1984), pp. 703-748.

Triantari, et al., “Minimising of Decolourisation Cost for Invert Cane Syrup Production Using Low Colour Sugarcane Varieties”, Sugar Tech : An International Journal of Sugar Crops and Related Industries, vol. 13, No. 1, (May 26, 2011), pp. 7-12.

* cited by examiner

Lime, optionally with charred calcium carbonate cake
Sugar Liquor
Limed Liquor
Carbonated liquor recycle
1
CO2 gas bubble distribution
CO2
Phosphoric acid
Filter
Partially Decolorized Liquor
Calcium Carbonate/Calcium Phosphate Cake

Figure 3

| Example 1 | | | | | Cations (ppm on solids basis) | | | | | | | | |
|---|---|---|---|---|---|---|---|---|---|---|---|---|---|
| | DS% | pH | Colour (ICUMSA) | Colour Removal (%) | Ca | Cu | Fe | K | Mg | Mn | Na | P | S |
| Feed Stock | 68.6 | 7.4 | 1284 | | 246 | 0 | 4 | 210 | 34 | 1 | 21 | 10 | 45 |
| Final Product | 70.3 | 8.2 | 611 | **52** | 294 | 0 | 2 | 202 | 26 | 0 | 40 | 19 | 52 |

| Example 1 | Anions & acids (ppm on solids basis) | | | | | | | | | | | Sugars (as % on solids) | | |
|---|---|---|---|---|---|---|---|---|---|---|---|---|---|---|
| | Chloride | Sulphate | Phosphate | Oxalate | Citrate | Aconitate | Lactate | Acetate | Malate | Formate | Nitrate | Sucrose | Glucose | Fructose |
| Feed Stock | 127 | 100 | 13 | 26 | 30 | 249 | 287 | 84 | 26 | 52 | 5 | 98.1 | 0.6 | 0.3 |
| Final Product | 120 | 108 | 52 | 64 | 14 | 157 | 289 | 98 | 22 | 59 | 20 | 98.6 | 0.3 | 0.1 |

Figure 4

| **Example 2** | | | | | **Cations (ppm on solids basis)** | | | | | | | | |
|---|---|---|---|---|---|---|---|---|---|---|---|---|---|
| | DS% | pH | Colour (ICUMSA) | Colour Removal (%) | Ca | Cu | Fe | K | Mg | Mn | Na | P | S |
| Feed Stock | 68.6 | 7.4 | 1284 | | 246 | 0 | 4 | 210 | 34 | 1 | 21 | 10 | 45 |
| Final Product | 68.0 | 8.3 | 342 | **73%** | 247 | 0 | 1 | 167 | 12 | 0 | 72 | 14 | 36 |

| **Example 2** | **Anions & acids (ppm on solids basis)** | | | | | | | | | | | **Sugars (as % on solids)** | | |
|---|---|---|---|---|---|---|---|---|---|---|---|---|---|---|
| | Chloride | Sulphate | Phosphate | Oxalate | Citrate | Aconitate | Lactate | Acetate | Malate | Formate | Nitrate | Sucrose | Glucose | Fructose |
| Feed Stock | 127 | 100 | 13 | 26 | 30 | 249 | 287 | 84 | 26 | 52 | 5 | 98.1 | 0.6 | 0.3 |
| Final Product | 122 | 71 | 37 | 72 | Not Detected | 28 | 440 | 122 | 10 | 84 | 22 | 98.4 | 0.2 | 0.1 |

Figure 5

| **Example 3** | | | | | **Cations (ppm on solids basis)** | | | | | | | | |
|---|---|---|---|---|---|---|---|---|---|---|---|---|---|
| | DS% | pH | Colour (ICUMSA) | Colour Removal (%) | Ca | Cu | Fe | K | Mg | Mn | Na | P | S |
| Feed Stock | 69.1 | 7.4 | 1227 | | 250 | 0 | 4 | 203 | 34 | 1 | 17 | 10 | 63 |
| Final Product | 69.2 | 3.5 | 707 | **42%** | 780 | 0 | 3 | 207 | 34 | 1 | 25 | 1090 | 73 |

| **Example 3** | **Anions & acids (ppm on solids basis)** | | | | | | | | | | **Sugars (as % on solids)** | | |
|---|---|---|---|---|---|---|---|---|---|---|---|---|---|
| | Chloride | Sulphate | Phosphate | Oxalate | Citrate | Aconitate | Lactate | Acetate | Malate | Formate | Nitrate | Sucrose | Glucose | Fructose |
| Feed Stock | 119 | 97 | 14 | 51 | 29 | 235 | 229 | 80 | 26 | 52 | 8 | 97.6 | 0.5 | 0.2 |
| Final Product | 114 | 96 | 3917 | 20 | 28 | 218 | 274 | 78 | 25 | 49 | 7 | 96.6 | 1.1 | 0.8 |

Figure 6a

| **Example 4** | | | | | **Cations (ppm on solids basis)** | | | | | | | | |
|---|---|---|---|---|---|---|---|---|---|---|---|---|---|
| | DS% | pH | Colour (ICUMSA) | Colour Removal (%) | Ca | Cu | Fe | K | Mg | Mn | Na | P | S |
| Feed Stock | 68.1 | 7.2 | 1321 | | 273 | 0 | 4 | 213 | 35 | 1 | 19 | 12 | 75 |
| Sample from Step 1 | 68.1 | 5.5 | 809 | 39% | 260 | 0 | 1 | 209 | 37 | 0 | 28 | 129 | 24 |
| Sample from Step 2 | 68.0 | 4.9 | 771 | 42% | 290 | 0 | 1 | 210 | 40 | 0 | 31 | 229 | 23 |
| Sample from Step 3 | 68.1 | 4.8 | 744 | 44% | 313 | 0 | 0 | 209 | 41 | 0 | 35 | 306 | 28 |
| Sample from Step 4 | 67.5 | 8.8 | 464 | 65% | 258 | Not Detected | 1 | 195 | 18 | 0 | 50 | 26 | 75 |
| Sample from Step 5 | 66.1 | 8.6 | 324 | 75% | 224 | 0 | 1 | 176 | 12 | 0 | 80 | 6 | 66 |

Figure 6b

| Example 4 | Anions & acids (ppm on solids basis) | | | | | | | | | | | Sugars (as % on solids) | | |
|---|---|---|---|---|---|---|---|---|---|---|---|---|---|---|
| | Chloride | Sulphate | Phosphate | Oxalate | Citrate | Aconitate | Lactate | Acetate | Malate | Formate | Nitrate | Sucrose | Glucose | Fructose |
| Feed Stock | 123 | 85 | 15 | 20 | 25 | 212 | 253 | 75 | 22 | 49 | 4 | 97.9 | 0.7 | 0.4 |
| Sample from Step 1 | 117 | 118 | 323 | 45 | 23 | 220 | 269 | 85 | 21 | 50 | 14 | 97.3 | 0.5 | 0.2 |
| Sample from Step 2 | 121 | 124 | 685 | 44 | 21 | 233 | 301 | 79 | 23 | 53 | 12 | 96.9 | 0.5 | 0.3 |
| Sample from Step 3 | 121 | 126 | 968 | 39 | 22 | 236 | 296 | 86 | 24 | 53 | 10 | 97.1 | 0.7 | 0.4 |
| Sample from Step 4 | 131 | 71 | 73 | 15 | Not Detected | 54 | 295 | 102 | 11 | 63 | 6 | 97.5 | 0.7 | 0.4 |
| Sample from Step 5 | 133 | 59 | 14 | 15 | Not Detected | 12 | 360 | 130 | 5 | 82 | 7 | 97.2 | 0.8 | 0.3 |

Figure 7

| **Example 5** | | | | | **Cations (ppm on solids basis)** | | | | | | | | |
|---|---|---|---|---|---|---|---|---|---|---|---|---|---|
| | DS% | pH | Colour (ICUMSA) | Colour Removal (%) | Ca | Cu | Fe | K | Mg | Mn | Na | P | S |
| Feed Stock | 68.0 | 7.3 | 1326 | | 247 | 0 | 4 | 210 | 35 | 1 | 21 | 11 | 22 |
| Final Product | 67.0 | 8.2 | 596 | **55%** | 343 | Not Detected | 6 | 208 | 24 | 0 | 25 | 4 | Not Detected |

| **Example 5** | **Anions & acids (ppm on solids basis)** | | | | | | | | | | | **Sugars (as % on solids)** | | |
|---|---|---|---|---|---|---|---|---|---|---|---|---|---|---|
| | Chloride | Sulphate | Phosphate | Oxalate | Citrate | Aconitate | Lactate | Acetate | Malate | Formate | Nitrate | Sucrose | Glucose | Fructose |
| Feed Stock | 122 | 120 | 18 | 59 | 34 | 257 | 307 | 76 | 24 | 50 | 16 | 97.6 | 0.4 | 0.3 |
| Final Product | 124 | 45 | 6 | 51 | Not Detected | 19 | 620 | 146 | 6 | 109 | 22 | 97.7 | 0.4 | 0.3 |

PURIFICATION PROCESSES

CROSS-REFERENCE TO RELATED APPLICATIONS

This is a U.S. National Phase Application of International Application No. PCT/GB2014/053777, filed Dec. 19, 2014, which claims the benefit of Great Britain Application No. 1322942.2, filed on Dec. 23, 2013, which are both incorporated herein by reference in their entirety.

FIELD

The invention relates to purification processes for treating a liquid to remove impurities including, for example colour bodies.

BACKGROUND

In many processing industries, "clarification" and/or "decolourisation" are often key processes for purifying a particular product. These terms refer to processes which are capable of removing a range of impurities which vary depending on the process stream being refined.

For example, (but not wishing to be limited by this example), clarification and decolourisation are key unit operations in the sugar processing industry. Indeed, in the sugar processing industry three main processes have been developed to simultaneously clarify and decolorize streams containing sugar. These processes are referred to as (i) carbonatation, (ii) phosphatation and (iii) sulphitation.

Essentially all these processes are similar in that they involve lime reacting with an acid to form respectively calcium carbonate, calcium phosphate and calcium sulphate. Each of these methods has their particular advantages and disadvantages.

Carbonatation is a particularly good process for relatively highly turbid and/or highly coloured streams. It is relatively expensive in terms of set up costs (capital expenditure), especially in view of the need to provide high pressure filtration systems. However, it is relatively inexpensive in terms of operating costs, for example, the acid used is carbonic acid which is readily available from cheap or even free sources. From a sustainability point of view, carbonatation captures $CO_2$, but it also leads to the production of a lot of waste, mainly in the form of calcium carbonate cake which is "contaminated" with the impurities and colour bodies removed from the stream being treated.

Phosphatation, in contrast, is a process which is relatively inexpensive to set up, and which produces significantly less waste than the carbonatation process. One drawback is that the phosphatation process uses phosphoric acid which is relatively expensive and which is becoming more and more scarce and difficult to source. Another drawback is that the phosphatation process requires the addition of relatively expensive colour precipitating chemicals to achieve similar purification performance to the carbonatation process. Additionally, if the phosphatation process is not closely controlled, waste water from this process can be relatively high in volume and also partially contaminated with phosphates.

Sulphitation is a process that is similar to carbonatation, but it has the added disadvantages that it can leave residual $SO_2$ and/or sulphur in the product, it can cause increased scaling in equipment, and the presence of sulphur in exhaust gases can be an environmental nuisance.

Carbonatation and sulphitation have been used in the sugar processing industry for over 100 years. Phosphatation has been used since around 1918, with the current widely used form of phosphatation (as disclosed in U.S. Pat. No. 3,698,951) used since 1971.

The purpose of all of these discussed processes is to remove solid impurities from the stream to be treated (such as sugar). Therefore, unsurprisingly, they all produce solid waste product streams that need to be disposed of. Importantly, the discussed processes of carbonatation, phosphatation and sulphitation are traditionally performed as separate and discrete processes and thus the waste product streams that they produce differ from each other in their by-product compositions. In the case of carbonatation, the by-product is a calcium carbonate cake. In the case of phosphatation, the by-product is calcium phosphate "scum" or "mud". In the case of sulphitation, the by-product is calcium sulphate "mud".

SUMMARY

According to a first aspect of the invention, a process is provided for the removal of contaminants from a liquor, the process comprising a combination of two or more of carbonatation, phosphatation or sulphitation to form precipitate comprising at least some of the contaminants from the liquor and separating the precipitate from the liquor.

In some embodiments, the process comprises: introducing phosphoric or sulphur-based acid into the liquor; and introducing carbon dioxide into the liquor.

In some embodiments, at least 50% or at least 70% of the contaminants contained in the liquor before the process are in the precipitate and thereby removed from the liquor.

In some embodiments, the contaminants removed from the liquor include colour bodies.

In some embodiments, the carbon dioxide is introduced by bubbling carbon dioxide gas through the liquor.

In some embodiments, the carbon dioxide gas comprises from about 20% or about 50% up to about 100% carbon dioxide. In some embodiments, the carbon dioxide gas comprises at least about 99% carbon dioxide.

In some embodiments, carbon dioxide gas bubbled into the liquor is recycled and reintroduced into the liquor, optionally in combination with fresh carbon dioxide gas. In some embodiments, at least 85% of the carbon dioxide bubbled through the liquor is either used in the carbonatation reaction or is recycled.

In some embodiments, carbon dioxide is generated by adding a metal carbonate to the liquor which will react with phosphoric acid in the liquor to generate carbon dioxide.

In some embodiments, the process further comprises introducing a metal or ammonium hydroxide into the liquor. In some embodiments, the metal hydroxide is calcium hydroxide.

In some embodiments, the precipitate is separated from the liquor by foam or froth floatation.

In some embodiments, the amount of precipitate is moderated by the addition of a calcium salt such as calcium carbonate, calcium phosphate or calcium sulphate. Optionally, the added calcium salt is one or more selected from the group consisting of: virgin calcium carbonate, calcium carbonate formed from a carbonatation step, or a material formed by charring calcium carbonate cake produced by a carbonatation step.

In some embodiments, the process involves adjusting the pH of the liquor to between about pH 5 and about pH 9, to between about pH 6 and about pH 8, between about pH 6.5 and about pH 7.5, or to about neutral pH.

In some embodiments, the precipitate is formed in a period of no more than about 30 minutes, no more than 20 minutes or no more than 10 minutes.

In some embodiments, the process further comprises introducing a surfactant into the liquor.

According to a second aspect of the invention, a sugar refining process is provided, comprising a process according to the first aspect of the invention.

According to a third aspect of the invention, a water decontamination process is provided, comprising a process according to the first aspect of the invention.

BRIEF DESCRIPTION OF DRAWINGS

For the purposes of example only, embodiments of the invention are described below with reference to the accompanying drawings, in which:

FIGS. 3 to 7 are tables of data which are referred to in the Examples.

DETAILED DESCRIPTION

Figure 1:
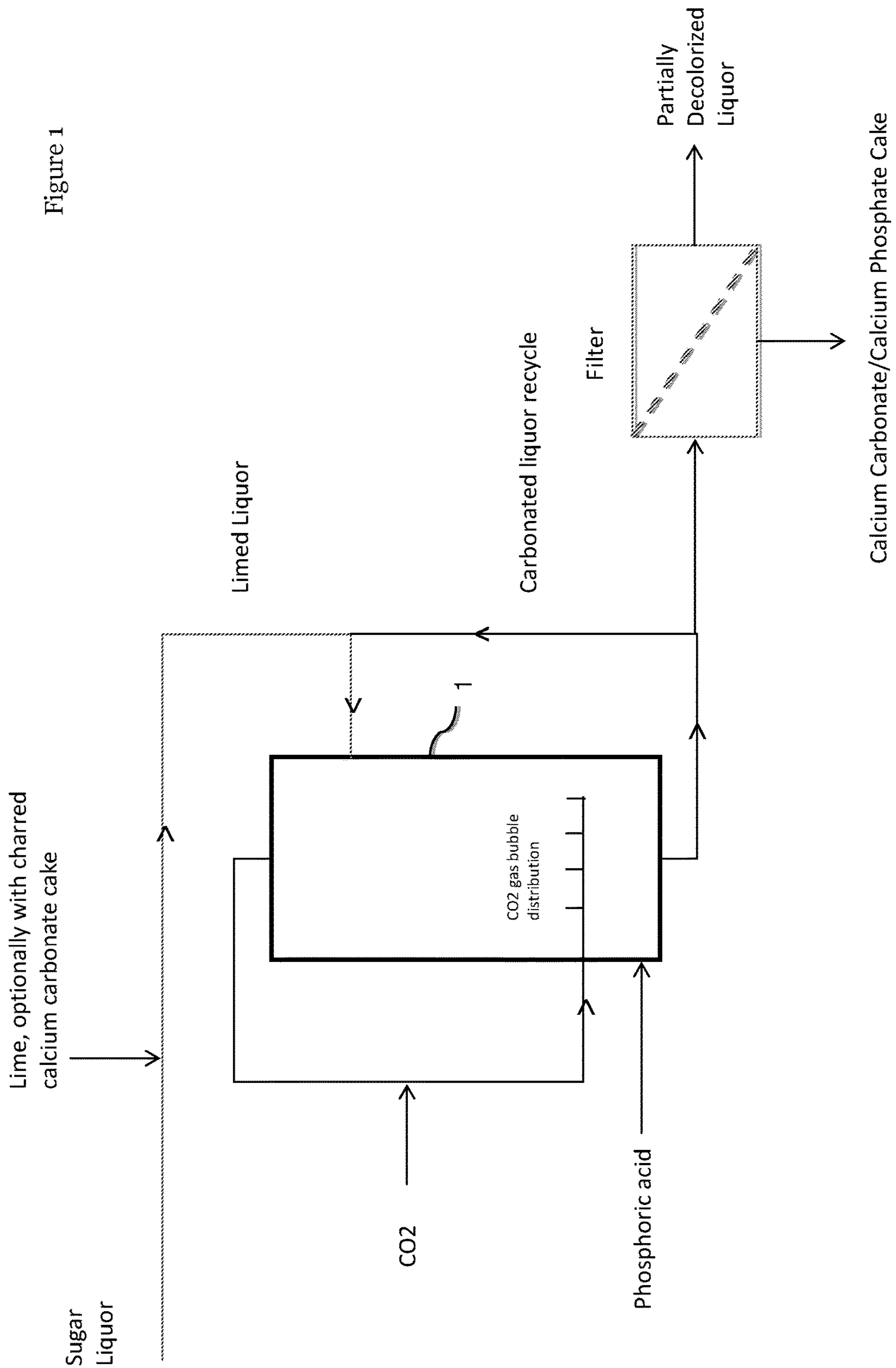
FIG. 1 is a schematic illustration of a system for treating a liquor using a process according to one embodiment of the invention.

As used herein, purification refers to clarification, decolourisation or other processes which result in the removal of undesired components from a liquid. These components to be removed include, for example, colour bodies, impurities, etc. As used herein, the term "colour bodies" may be used interchangeably with the term "impurities".

As used herein, the liquid to be treated is referred to as a liquor. This refers to a solution or liquid including contaminants that are to be removed. In many embodiments of the invention, the liquor is an aqueous solution. It may contain a variety of different contaminants, such as, for example, colour bodies or ions. The liquor may be produced or result from a variety of different processes. For example, and by no means intended to be limiting, the liquor may be produced as part of a refining process, such as sugar cane or sugar beet refining. Alternatively, the liquor may, for example, be used to treat liquids formed by other industrial processes.

Carbonatation is a chemical reaction in which a hydroxide reacts with carbon dioxide and forms an insoluble carbonate. For example, the hydroxide may be calcium hydroxide, so that calcium carbonate is formed:

$$Ca(OH)_2+CO_2 \rightarrow CaCO_3+H_2O$$

Carbonatation is used in a variety of different ways as part of a variety of different processes. In some of these processes, the carbonatation is used to remove undesirable constituents or contaminants.

For example, carbonatation may be used in sucrose refining. In such processes, calcium hydroxide, which is also commonly referred to as "lime", is added to a coloured sucrose syrup, often in the form of an aqueous calcium hydroxide suspension (known as limewater and often formed by adding calcium oxide to water). The mixture is agitated and $CO_2$ is bubbled into the mixture. This causes calcium carbonate to form and precipitate out of the solution. During the precipitation and subsequent flocculation that the calcium carbonate undergoes, colour bodies in the syrup are bound up and trapped in the precipitate:

$$Ca(OH)_2+CO_2+\text{free colour bodies} \rightarrow Ca(CO_3)\text{ with bound colour bodies}+H_2O$$

By subsequently filtering the resulting suspension to remove the calcium carbonate and bound colour bodies through a suitable filter medium, colour bodies can be readily removed from the syrup, forming a partially decolourised liquor for further processing.

In practice, the source of the carbon dioxide is often the flue gases from boilers used on site. These gases can contain up to 10-15% $CO_2$.

Phosphatation is a chemical reaction which involves the addition of phosphoric acid ($H_3PO_4$) and lime (calcium hydroxide) to a liquid to be treated, so as to form insoluble calcium phosphate precipitates. The use of this process in sugar refining is disclosed in U.S. Pat. No. 3,698,951.

The phosphatation process gives rise to a floc which can be filtered but which is preferably separated in a flotation process which involves the addition of a cationic surfactant such as a long hydrocarbon chain quaternary ammonium compound which may be used to precipitate colour-imparting impurities and other high molecular weight anionic impurities. This precipitation reaction gives rise to a highly flocculated precipitate which includes insoluble impurities and most of the colorant impurities.

The floc sometimes rises spontaneously to the surface, or this separation can be enhanced by association with air-bubbles formed during stirring or released from solution in the treated liquor, which is preferably in the range 70-90° C. Alternatively, gas such as air may be injected as a steady stream of small bubbles to accelerate the separation.

Sulphitation is a chemical reaction which involves the addition of sulphur dioxide ($SO_2$) or sulphuric acid ($H_2SO_4$) and lime (calcium hydroxide) to a liquid to be treated, so as to form insoluble calcium sulphate precipitates.

Carbonatation, phosphatation and sulphitation are used in a variety of different ways as part of a variety of different processes. In some of these processes, such as in the refining of sugar and related or similar processes, carbonatation, phosphatation or sulphitation are used to remove undesirable constituents or contaminants.

In light of the above discussion of the disadvantages associated with carbonatation, phosphatation and sulphitation, the present invention seeks to combine elements of any or all of these individual processes to produce a "hybrid" process which enjoys the advantages of the individual processes but that reduces or eliminates at least some of their disadvantages. The following description focuses on the particular case of phosphoric and carbonic acids, but clearly any other suitable acid that forms an insoluble salt may be used.

At least some of the discussed advantages are achieved by a process in which the liquor undergoes both carbonatation and phosphatation or sulphitation. These process steps occur together, so that a precipitate is formed comprising both a carbonate and phosphate or sulphite.

In the past, "combinations" of one or more of carbonatation, phosphatation or sulphitation have sometimes been proposed. However, this involves performing the different processes in series, often with separation required at the end of each step. This makes such a combination of processes expensive and it would not be a commercially viable approach.

It has not previously been suggested that one could combine two or more of carbonatation, phosphatation or sulphitation into a single process. One of the advantages associated with such a "hybrid" process is that separation of precipitate is only required at the end of the single process step, making the combined process effective, efficient and commercially viable.

It has previously been reported that carbonatation removes 55-60% of colour whereas phosphatation removes only about 25-30% of colour.

The benefit of adding the carbonatation to a phosphatation step is that the carbonatation requires relatively cheap and readily available raw materials. The introduction of $CO_2$ results in a reduction in pH which can help reduce the amount of phosphoric acid added. The hybrid process combines the benefits of carbonatation and phosphatation. Without wishing to be bound by theory, some colour species and/or other impurities are better removed by carbonatation and some by phosphatation. As mentioned above, it is not economically desirable to have these processes in series but combining the two processed into one makes the combination cost effective. What is more, as shown below in the Examples, we have shown a colour removal of up to 75% using the hybrid processes according to the present invention.

It is generally reported that, in sugar refining, it is necessary to follow the carbonatation process with an ion exchange resin (IER) process in order to remove some of the colour bodies that the carbonatation process has not been able to remove. However, the impurities that the IER process removes are very similar to those removed by the phosphatation process. Hence, the hybrid process should require less ion exchange resin processing.

If the carbonatation is added to a sulphitation step, this can similarly reduce the amount of $SO_2$ added, which reduces the risk of sulphur contamination of the product.

This process may be used to remove contaminants such as colour bodies from a liquid which has been produced as part of the sugar refining process. Particularly, it may be the liquid resulting from the affination step.

In some embodiments, the starting material is an affination liquor, containing about 65% dissolved solids. These solids include contaminants such as colour bodies.

In some embodiments, the process may be set up by adapting an existing system for carrying out carbonatation. In other embodiments, the process may be set up by adapting an existing system for carrying out phosphatation. In yet further embodiments, the process may be set up by adapting an existing system for carrying out sulphitation. Alternatively, the system may be new.

In some embodiments, the process for the removal of contaminants from a liquor comprises:

introducing phosphoric acid into the liquor;

introducing carbon dioxide into the liquor; and separating the precipitate formed from the liquor, the precipitate comprising at least some of the contaminants from the liquor.

The precipitate will be formed by phosphatation and carbonatation and so the particles comprise both carbonate and phosphate.

In some embodiments, the process will further include the addition of a metal or ammonium hydroxide. In some embodiments, the metal or ammonium hydroxide is calcium hydroxide. This may be added to the liquor in the form of "milk of lime", an aqueous suspension of calcium hydroxide. The dosing of added lime is normally quoted as a weight % on sugar solids on a dry solids basis and typically may vary between about 0.05% to about 5%.

In other embodiments, an alternative source of calcium ions is introduced into the reaction mixture. For example, in some embodiments, the process includes introducing calcium carbonate into the liquor. When this reacts with the phosphoric acid, one or several things can happen depending upon the conditions used:

(i) it can usefully form carbon dioxide which may be used to aid the froth flotation process (ii) calcium phosphate can precipitate or co-precipitate out of the liquid/solution, trapping contaminants. The solubility product of calcium carbonate is $3.36*10^{-9}$ (calcite) or $6.0*10^{-9}$ (aragonite), whereas the solubility product of calcium phosphate ($Ca_3(PO_4)_2$) is $2.07*10^{-33}$ and that of calcium sulphate is $4.93*10^{-5}$ Thus, a person skilled in the art will recognise that by varying the concentrations of phosphoric acid and carbonic acid in the mixture/solution, it will be possible to form mixed salts of calcium phosphate and calcium carbonate.

The above process (with or without froth flotation) is useful in the treatment of acidic wastes arising from a variety of industries (e.g. the pharmaceutical, metallurgical and mining industries, etc.), as the waste stream is simultaneously treated with a decolorising medium as well as a pH adjusting compound.

Thus, in some embodiments, the carbon dioxide may be formed in situ as a result of reactions occurring in the liquor. Alternatively or in addition, carbon dioxide may be introduced into the liquor by bubbling a carbon dioxide-containing gas through the liquor, for example in a reaction vessel. Alternatively, or in addition, the $CO_2$ may be predissolved under pressure in the mixture and then be allowed to "come out of solution" by releasing the pressure. This would aid the froth flotation process. In traditional carbonatation processes used in sugar refining, the $CO_2$ is provided from boiler flue gas which can have a $CO_2$ concentration of up about 20%. The $CO_2$ concentration of such gasses can be increased by scrubbing or the like. Alternatively, alternative sources of $CO_2$ may be used. For example, the processes of the invention may use commercially available, high concentration carbon dioxide gas.

In some embodiments, the process comprises:

introducing a metal or ammonium hydroxide into the liquor;

introducing phosphoric or a sulphur-based acid into the liquor;

introducing carbon dioxide into the liquor; and separating the precipitate formed from the liquor, the precipitate comprising at least some of the contaminants from the liquor. In some embodiments, the separation may be filtration to produce a cake comprising calcium carbonate and calcium phosphate.

One embodiment of the purification process discussed is illustrated in FIG. 1. The schematic drawing shows the liquor to be treated being fed into a reaction vessel 1. On its way into the vessel, lime is added to the liquor. In an optional step, a calcium salt is added. The calcium salt may be, for example, calcium carbonate, calcium phosphate and/or calcium sulphate. The calcium salt may, for example, be: "virgin" or pure calcium carbonate or calcium phosphate; calcium carbonate formed from a carbonatation step (precipitated calcium carbonate or "calcium carbonate cake"), optionally in the form of a material formed by charring calcium carbonate cake formed, for example, by a carbonatation step; calcium phosphate formed from a phosphatation step, optionally in the form of a material formed by charring calcium phosphate formed, for example, by a phosphatation step. Then phosphoric acid is added. When the mixture is added to a reaction vessel 1, $CO_2$ gas is bubbled through the mixture. Optionally, the phosphoric acid may be added concomitantly or with the $CO_2$ stream, or indeed concomitantly or with the calcium salt (such as virgin calcium carbonate/phosphate or precipitated calcium carbonate/phosphate, or with the charred calcium carbonate/phosphate stream). In the embodiment illustrated, the apparatus is adapted to perform the optional step of capturing the unabsorbed and unreacted $CO_2$ at the top of the vessel 1 and feeding this recycled $CO_2$ back into the bottom of the vessel. The precipitate (containing trapped impurities such as colour bodies) is formed in the vessel 1 and is separated from the liquor by filtration. This results in a partially decolorized liquor and a filtration cake comprising the precipitate formed by the carbonatation and phosphatation, and trapped impurities or contaminants.

In some embodiments, the process comprises forming a froth or foam which comprises the precipitate formed by the carbonatation and which may be separated from the liquor to remove the precipitate and the trapped impurities such as colour bodies.

Figure 2:
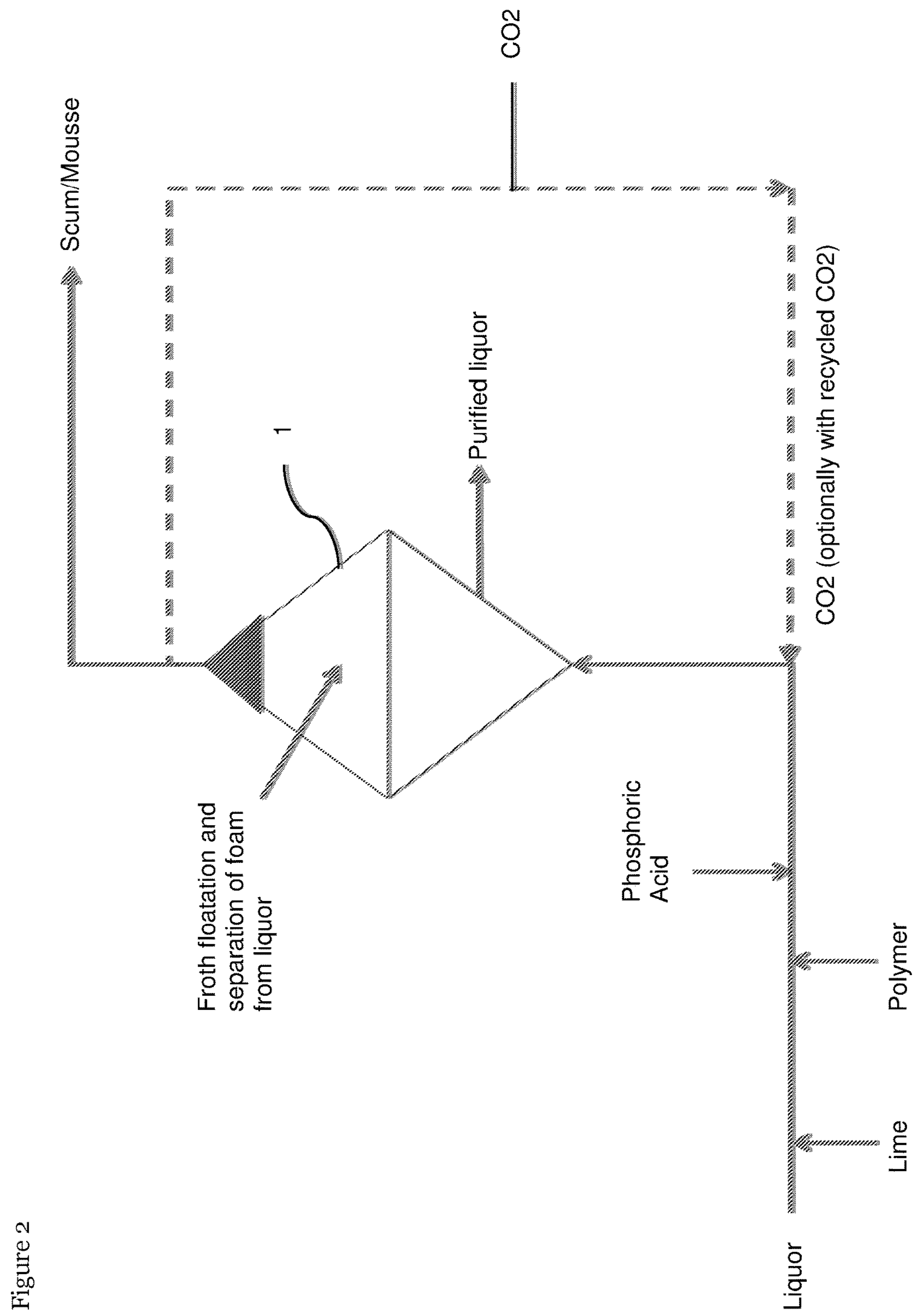
FIG. 2 is a schematic illustration of a system for treating a liquor using a process according to another embodiment of the invention.

One embodiment of the purification process discussed is illustrated in FIG. 2. The schematic drawing shows the liquor to be treated being fed into a reaction vessel 1. On its way into the vessel, lime is added to the liquor. Next, in an optional step, a polymer is added which acts as a surfactant. Then phosphoric acid is added. When the mixture is added to a reaction vessel 1, $CO_2$ gas is bubbled through the mixture. In the embodiment illustrated, the apparatus is adapted to perform the optional step of capturing the unabsorbed and unreacted $CO_2$ at the top of the vessel 1 and feeding this recycled $CO_2$ back into the bottom of the vessel. Optionally, the phosphoric acid may be added concomitantly or with the $CO_2$ stream, or indeed concomitantly with the virgin calcium carbonate/phosphate or precipitated calcium carbonate/phosphate or charred calcium carbonate/phosphate stream. A foam or froth containing the precipitate and trapped impurities such as colour bodies is formed in the vessel 1 and this floats to the top of the liquor. The foam and liquid are separated, to provide a purified liquor from which colour bodies and other impurities or contaminants have been removed, and a mousse or scum containing the precipitate formed by the carbonatation and phosphatation, and trapped impurities or contaminants.

In at least some embodiments, the process results in the formation of a froth or foam containing the precipitate. In some embodiments, the froth or foam may be readily separated from the purified or clarified liquor, and the product is a scum or mousse.

The polymer referred to in FIG. 2 is a polymer which will act as a surfactant. Such polymers are known from phosphatation processes, such as those disclosed in U.S. Pat. No. 3,698,951.

In some embodiments, the process includes the addition of a surfactant. The function of the surfactant is to form "bridges" between the smaller particles so that they coagulate or flocculate and are thereby more amenable to phase separation. Suitable surfactants include, for example, long hydrocarbon chain quaternary ammonium compounds, long hydrocarbon chain tertiary amines and long hydrocarbon chain pyridinium compounds, such as a dialkyl dimethyl quaternary ammonium compound wherein at least one of the alkyl groups contains at least 8 carbon atoms, dihexadecyldimethyl quaternary ammonium compounds, and dioctadecyldimethyl quaternary ammonium compounds, or mixtures thereof.

However, in some embodiments, no surfactant is added. This component, which is generally considered to be essential in conventional phosphatation processes, is not necessary in some embodiments of the present invention because the size and shape of the precipitate can be controlled and/or manipulated (for example by adjusting the $CO_2$ concentration as discussed above) so that they aid the separation by froth floatation.

In some embodiments, which may be particularly preferred in certain circumstances, the precipitate is separated by filtration, centrifugation or decantation processes. Filtration technologies well known in the sugar refinery industry include fast flow gravity separation, Putsch presses and Gaudfrin filtration systems, for example, but other suitable separation processes would be known to the skilled person and could be used.

The $CO_2$ bubbled through the liquor will have the effect of reducing the pH of the liquor and it can be used to replace anywhere from 0.05 to 99.95% of the phosphoric acid usually used in a conventional phosphatation process, or replacing from about 0.5 to about 99.5% or from about 1 to about 99% of the phosphoric acid.

There are a number of factors in play in the processes and these all have to be taken into consideration in the processes of the present invention. For example, pH control is important.

In some embodiments, the target pH at the end of the process is around 8.1-8.3. There are advantages associated with having the pH as close to neutral as possible, but below a pH of about 8 the $CaCO_3$ may re-dissolve in the form of calcium hydrogencarbonate (also known as calcium bicarbonate). This may present, for example, problems of scaling in the process or downstream of the process.

The addition of the hydroxide to the liquor will increase the pH and it may, in some embodiments, be important to quickly reduce the pH to the target range. This may be achieved by the combination of adding the phosphoric acid and $CO_2$.

The ratio in which the phosphoric acid and $CO_2$ are added to the liquor may be adjusted as desired. In some embodiments it will be desirable to reduce the amount of phosphoric acid as this is an expensive material. A further consideration is that the ratio of phosphoric acid to $CO_2$ will influence or determine the ratio of calcium carbonate to calcium phosphate in the resultant by-product. In addition, the amount of phosphoric acid and $CO_2$ required to adjust the pH will be dependent upon the amount of lime added to the liquor.

By varying the amount of phosphoric acid, $CO_2$ or lime added to the liquor, the pH of the liquor may be varied from about pH 1, 2, 3, 4, 5, 6, 7, 8, 9, 10, 11, 12, 13 to about pH 14, 13, 12, 11, 10, 9, 8, 7, 6, 5, 4, 3, 2. In particular embodiments the pH of the liquor may be varied between about 2 to about 13, between about 3 to about 12 or between about 4 to about 11. It can be difficult to achieve a pH of below about 4 by using $CO_2$ on its own. Where required, a pH of below about 4 may be achieved by adjusting the pH to about 4 using $CO_2$ and then adding phosphoric acid to bring the pH to below 4.

In some embodiments, the $CO_2$ is introduced into the liquor under pressure, for example it is introduced into the liquor following the introduction of the liquor into a reaction vessel. Where the $CO_2$ is introduced under pressure, the acidity of the $CO_2$ is enhanced as it dissolves more effectively in the liquid being treated.

Often, in a "froth flotation" process (where separation is achieved by the formation of a froth or foam which rises to the top of the liquor and can be readily separated from the liquor), an added gas is desirable as it may enhance the rate of separation of the impurities from the main stream. In some embodiments, this gas will reduce the physical footprint of the apparatus used for the purification process. In some embodiments, the $CO_2$ gas can provide this function as well as contributing to the adjustment of the pH and the formation of the calcium carbonate precipitate. In some embodiments, the $CO_2$ may be generated in situ, from carbonate salts (such as calcium carbonate) by the addition of phosphoric acid.

In some embodiments, the $CO_2$ pressure and/or the operating pressure of the vessel can be used to optimize the size and shape of the particles formed as a result of carbonatation. For example, by operating the process at slightly elevated pressures (say, 1-5 bar) the speed of the reaction can be accelerated which will result in smaller particles of precipitate. Selecting the pressure to form very small particles can, in some embodiments, render the particles ideal for separation by flotation. In contrast, if separation is to be achieved by filtration, larger particles are preferred, and the shape, size and particle size distribution of these particles are all important for the filtration process (with particles of too small a size being very difficult to filter).

In some embodiments, the process is carried out in a single reaction vessel. In some embodiments, there is no recycling of the liquor out of and back into the reaction vessel (for example, in order to increase the period of time for which the liquor is resident in the vessel). In other embodiments, the process may be carried out in multiple stages and/or may be carried out in multiple reaction vessels.

In some embodiments, the phosphoric acid is added after the $CO_2$. In other embodiments, the phosphoric acid is added before the $CO_2$. In yet further embodiments, the phosphoric acid and $CO_2$ are added at the same time.

In some embodiments, the $CO_2$ is added to adjust the pH of the lime-treated liquor to a first target value. In some embodiments, that first target value is between about 10 and about 9. Then, in such embodiments, phosphoric acid is added to adjust the pH of the liquor to a second target value of 8 to 8.5. In some embodiments, the second target pH value is 8.1 to 8.3.

In some embodiments, the average or mean particle size of the precipitate may be from about 1 to about 100 μm, but the shape and size of the particles and their particle size distribution can be optimised for different purposes. Whilst smaller particles of precipitate can present a problem for separation from the liquor by filtration, smaller particles of precipitate lend themselves well to being separated by foam floatation.

In some embodiments, the precipitate particles are generally spherical in shape. In some alternative embodiments, the precipitate particles have an elongate shape, optionally being long and thin. It is believed that the faster the precipitate is formed, the more elongate the particles. Compared to the larger, more spherical particles, the smaller, elongate particles are more readily trapped by the formation of a foam or froth.

The higher the concentration of the $CO_2$ bubbled through the liquor, the faster the formation of the calcium carbonate part of the precipitate and the smaller and more elongate the particles formed. This makes them particularly well suited to being separated from the liquor by foam floatation.

In some embodiments, the $CO_2$ introduced into the liquor to be treated has a concentration of at least about 15%, about 20%, about 25%, about 30%, about 35%, about 40%, about 45%, about 50%, about 55%, about 60%, about 65%, about 70%, about 75%, about 80%, about 85%, about 90%, about 95%, about 97%, about 99% or about 100%.

The duration of the reaction is very rapid but can (in effect) be prolonged by a recycling step. For example, this may involve taking some of the liquor (reaction liquid) which has left the reaction vessel and feeding it back into the vessel, thereby increasing the average time for which the liquid is resident in the vessel, in which the reaction is taking place. The reaction time is also a function of the concentration of the acid used (be it $CO_2$ or phosphoric acid). The residence time in the reaction vessel can be between 10 seconds to 10 hours. The longer the residence time, the larger the precipitate crystals will grow and so the residence time may be used to adjust the size of the precipitate particles, to render them suitable for the separation method to be used.

The sequence in which the $CO_2$ and phosphoric acid are introduced into the liquor has an impact on the reaction. The specific groups on the surface of the particles of precipitate that form as a result of the carbonatation or phosphatation will have different adsorption properties for different impurities. This means that the precipitate will extract different impurities during different phases of the process, depending upon whether it is the carbonate or phosphate precipitate being formed.

In some embodiments, it is possible to adjust the processes of the invention to control the surface of the particles of precipitate. In some embodiments, for example, the surface could comprise for instance primarily calcium phosphate or primarily calcium carbonate, or any "hybrid" mixture thereof (e.g. 50% calcium phosphate and 50% calcium carbonate).

The particles are formed as a "seed" initially, once the solubility of the salt is exceeded. Then the particles "grow" via a diffusion process, wherein the acid dissolved in the solvent (phosphate or carbonic) diffuses to the surface of the seed.

In some embodiments, the process results in at least about 40% of the contaminants in the starting liquor being removed. In some embodiments at least about 50%, at least about 55%, at least about 60%, at least about 65%, at least about 70%, at least about 75% or at least about 80% of the contaminant are removed by the process. In some embodiments, the removed contaminants include or consist of colour bodies.

In some embodiments, the carbon dioxide gas bubbled into the liquor is recycled and reintroduced into the liquor, optionally in combination with fresh carbon dioxide gas. This means that any carbon dioxide which was not absorbed and does not react when in the liquor is captured and fed back into the system so that it may be re-introduced into the liquor.

In some embodiments, at least about 70%, at least about 75%, at least about 80% or at least about 85% of the carbon dioxide bubbled through the liquor is either used in the carbonatation reaction or is recycled.

In some embodiments, the process is carried out in a closed system. For example, the $CO_2$ may be introduced into the liquor in a closed reaction vessel. This allows the pressure and temperature to be controlled. In addition, this makes it simple to capture the unused $CO_2$ for recycling. Finally, this also has the advantage that is possible to "capture" any exhaust gases, aromas or the like.

The improved purification processes disclosed and claimed herein may be used in processes in which carbonatation or phosphatation is currently used, to gain one or more of the above mentioned advantages.

Thus, for example and by no means intended to be limiting, the purification processes according to the present invention may be used as part of sugar refining processes and other processes where the novel process is more commercially viable and can be more effective. As discussed above, it is already known to use carbonatation in sugar and High Intensity Sweetener refining processes.

In addition, the purification processes according to the present invention may also be used in the treatment of waste streams from various industries, for the removal of undesired constituents and contaminants. For example, the waste streams may be waste water (both in the water industries and other industries) and the purification processes of the invention may be used to remove undesired constituents or contaminants from the water.

In one embodiment, the waste water is, for example, the regenerant water produced when an ion exchange resin is regenerated. Ion-exchange resins are widely used in different separation, purification, and decontamination processes. The most common examples are water softening and water purification, juice purification and in the manufacture of sugar. An ion exchange resin works by exchanging sodium for contaminants in the liquid being filtered/treated. In the case of water softening, the contaminants might be calcium and magnesium ions, in the case of ion exchange resins used in sugar processing, they might be colour bodies and non-coloured components.

When an ion exchange resin requires regeneration, this is achieved by washing the resin with a salt solution, such as brine (a sodium chloride solution). This reverses the reaction, releasing the trapped contaminants in exchange for the sodium in the brine. The resulting ion exchange regenerant material may have high concentrations of salt and contaminants and this regenerant may be treated using a purification process according to the present invention to remove those contaminants and produce water with significantly reduced total dissolved solids and a precipitate containing trapped contaminants.

The purification processes described herein remove undesired constituents, also referred to interchangeably herein as contaminants, from a starting material or liquor. The term liquor as used herein means a liquid (optionally in the form of a solution or suspension) which includes contaminants. In some embodiments, the liquor may be a liquid that has been produced or used in a process.

As particular examples which should not be interpreted as being limited, the liquor may be, for example, a liquid which has been produced as part of the sugar refining process. Particularly, it may be the liquid resulting from the affination step. Alternatively, the liquor may be waste water, in the form of a solution or suspension. For example, the waste water may result from a rinsing or cleaning step, including, for instance, an ion exchange regenerant material which may contain contaminants from the regeneration of the ion exchange resin. As used herein, the term “ion exchange regenerant material” refers to any material exiting the resin during the regeneration process. Alternatively, the liquor may be hard water, which is water containing multivalent cations as undesired constituents or contaminants which are to be removed.

Example 1

This example involved a batch stirred reaction of feedstock (2613 g, 68.6% dried solids, Colour 1284 ICUMSA) which was carbonatated with a freshly prepared 10% lime solution, at 0.05% CaO on sugar solids. The liquor was recycled back into the reaction vessel at a recycle flow rate of 30%/min.

The stirred mixture was carbonatated at 65° C. for 5 minutes with a 27% carbon dioxide gas (99.995%), 73% air mixture, and the introduction of carbon dioxide was stopped when the pH reached 9.0. Further pH reduction was achieved by the addition of 85% (ortho)phosphoric acid (0.028% on sugar solids), until pH 8.3 was reached. The average total residence time of the liquor in the reaction vessel was 10 minutes. This means that this was the average total time for which the liquor was exposed to the $CO_2$ and carbonatation was able to occur and the precipitate crystals were able to grow.

A sample of the final reaction mixture was laboratory filtered and analysed. The extent of colour removal was 52%.

Standard carbonatation reactions typically remove approximately 55% of the colour with a lime dosing of 0.75% on sugar solids. In contrast, in this example, the lime dosing is very low at 0.05% on sugar solids, resulting in 52% colour removal, and a short residence time of just 10 minutes.

The results of the analysis of the starting liquid (i.e. the feedstock) and the resultant product are shown in the tables of FIG. 3.

Example 2

This example involved a batch stirred reaction of feedstock (2214 g, 68.6% dried solids, Colour 1284 ICUMSA) which was carbonatated with a freshly prepared 10% lime solution, at 0.5% CaO on sugar solids. The liquor recycle flow rate was 30%/min.

The stirred mixture was carbonatated at 65° C. for 15 minutes with a 27% carbon dioxide (99.995%), 73% air mixture, and the introduction of carbon dioxide was stopped when the pH reached 9.7. Further pH reduction was achieved by the addition of 85% (ortho)phosphoric acid (0.145% on sugar solids), until pH 8.3 was reached.

A sample of the final reaction mixture was laboratory filtered and analysed. The extent of colour removal was 73%.

In this example the lime dosing was again low at 0.5% on sugar solids, and a residence time (i.e. the average total time of the liquor exposed to the $CO_2$) of 15 minutes, resulting in 73% colour removal.

The results of the analysis of the starting liquid (i.e. the feedstock) and the resultant product are shown in the tables of FIG. 4.

Example 3

This example involved a batch stirred reaction of feedstock (22383 g, 69.1% dried solids, Colour 1227 ICUMSA) was mixed with a powdered source of calcium carbonate which was made from charred calcium carbonate cake, the cake having been formed from a carbonatation process used in refining sugar. The powdered calcium carbonate material was included in an amount of 1.0% on sugar solids, which this equates to lime contained in the charred calcium carbonate cake of 0.07% and carbon content of 0.03% on sugar solids. The liquor recycle flow rate was 30%/min.

The stirred mixture was kept at 65° C. with a starting pH of 8.2, over a period of 20 minutes (the residence time, i.e. the average total time of the liquor exposed to the $CO_2$). Then 85% orthophosphoric acid (0.44% on sugar solids) was added until a final pH of 4.0 was reached.

A sample of the final reaction mixture was laboratory filtered and analysed. The extent of colour removal was 42%.

In this example no carbon dioxide gas or lime is added to the reaction. The addition of the calcium carbonate increases the pH and the calcium carbonate reacts with the phosphoric acid in the reaction mixture to form carbon dioxide in situ.

The results of the analysis of the starting liquid (i.e. the feedstock) and the resultant product are shown in the tables of FIG. 5.

Example 4

This example involved a batch stirred reaction of feedstock (2416 g, 68.1% dried solids, Colour 1321 ICUMSA) was mixed with a powder formed from charred calcium carbonate cake (obtained as a result of a carbonatation process used in refining sugar) at 1.1% on sugar solids. This equates to lime contained in charred calcium carbonate cake of 0.07% and carbon content of 0.03% on sugar solids. The liquor recycle flow rate was 30%/min.

Step 1: The stirred reaction mixture was kept at 65° C., with a starting pH of 8.2, over a 10 minute period. Then 85% orthophosphoric acid (0.036% on sugar solids) was added until a final pH of solution of 5.5 was reached. A sample of the reaction mixture from Step 1 was laboratory filtered and analysed. The extent of the colour removal was 39%.

Step 2: Further 85% orthophosphoric acid was added to the stirred mixture (0.018% on sugar solids) from Step 1, and allowed to react for 10 minutes. A sample of the reaction mixture from Step 2 was laboratory filtered and analysed. The extent of the colour removal was 42%.

Step 3: Further 85% orthophosphoric was added to the stirred mixture (0.018% on sugar solids) from Step 2 and allowed to react for 10 minutes. A sample of the reaction mixture from Step 3 was laboratory filtered and analysed. The extent of the colour removal was 44%.

Step 4: To the stirred mixture from Step 3, a freshly prepared 10% lime solution was added at 0.25% on sugar solids, and the solution was carbonatated by bubbling carbon dioxide gas (99.999%) through the mixture. Carbonatation was stopped at pH 8.8. A sample of the reaction mixture from Step 4 was laboratory filtered and analysed. The extent of the colour removal was 65%.

Step 5: To the stirred mixture from Step 4 an additional 10% freshly prepared lime solution was added at 0.23% on sugar solids, and the solution was carbonatated with carbon dioxide gas (99.999%). Carbonatation was stopped at pH 8.4. A sample of reaction mixture from Step 5 was laboratory filtered and analysed. The extent of colour removal was 75%.

Thus, to summarise, Steps 1 to 3 of this example refer to the addition of orthophosphoric acid to a feed stock containing 1.1% charred calcium carbonate cake. Steps 4 and 5 are lime carbonatation steps at low lime levels—0.25 and 0.23% on sugar solids—producing a final colour removal 75%. In total, orthophosphoric acid was added in an amount of 0.072% on sugar solids, and lime addition was added in an amount of 0.047% CaO on sugar solids.

The results are shown in the tables of FIGS. 6*a* and 6*b*.

Example 5

This example involved a batch stirred reaction of feedstock (2323 g, 68.0% dried solids and Colour 1326 ICUMSA) was carbonatated with a freshly prepared 10% lime solution, at 0.39% on sugar solids, plus 1.8% of powder formed from charred calcium carbonate cake, providing 0.04% carbon on solids The liquor recycle flow rate was 30%/min.

The stirred mixture was carbonatated at 65° C. for 20 minutes by bubbling carbon dioxide gas (at 99.995%) through the mixture, and stopped at pH 90.8. Further pH reduction was achieved by the addition of 85% Phosphoric acid (0.04% on sugar solids), until pH 8.3 was reached. A sample of the final reaction mixture was laboratory filtered and analysed. The extent of the colour removal was 55%.

Results are shown in the tables of FIG. 7.

From the foregoing examples it is clear that the combination of carbonatation and phosphatation in a single reaction results in excellent contaminant removal, with colour removal of up to 75% being observed.

The invention claimed is:

1. A process for the removal of contaminants from a liquor, the process comprising a combination of carbonatation and phosphatation and optionally sulphitation occurring together to form precipitate comprising at least some of the contaminants from the liquor in a reaction vessel and separating the precipitate from the liquor, wherein the precipitate comprises particles that comprise both carbonate and phosphate and wherein the size of the particles is increased by feeding a portion of the liquor which has left the reaction vessel back into the reaction vessel.

2. The process of claim 1, comprising: introducing phosphoric or sulphur-based acid into the liquor; and introducing carbon dioxide into the liquor.

3. The process of claim 2, wherein the phosphoric acid is added before the carbon dioxide, or wherein the phosphoric acid and carbon dioxide are added at the same time.

4. The process of claim 1, wherein at least 50% of the contaminants contained in the liquor before the process are in the precipitate and thereby removed from the liquor.

5. The process of claim 1, wherein the contaminants removed from the liquor include colour bodies.

6. The process of claim 2, wherein the carbon dioxide is introduced by bubbling carbon dioxide gas through the liquor.

7. The process of claim 6, wherein the carbon dioxide gas comprises from about 10% up to about 100% carbon dioxide.

8. The process of claim 7, wherein the carbon dioxide gas comprises at least about 99% carbon dioxide.

9. The process of claim 6, wherein carbon dioxide gas bubbled into the liquor is recycled and reintroduced into the liquor, optionally in combination with fresh carbon dioxide gas.

10. The process of claim 9, wherein at least 85% of the carbon dioxide bubbled through the liquor is either used in the carbonatation reaction or is recycled.

11. The process of claim 1, wherein carbon dioxide is generated by adding a metal carbonate to the liquor which will react with phosphoric acid in the liquor to generate carbon dioxide.

12. The process of claim 1, further comprising introducing calcium hydroxide into the liquor.

13. The process of claim 1, wherein the precipitate is separated from the liquor by foam or froth floatation.

14. The process of claim 1, wherein the amount of precipitate is moderated by the addition of a calcium carbonate or phosphate salt.

15. The process of claim 14, wherein the added calcium carbonate or phosphate salt is one or more selected from the group consisting of: pure calcium carbonate or calcium phosphate; calcium carbonate formed from a carbonatation step; a material formed by charring calcium carbonate produced by a carbonatation step; calcium phosphate formed from a phosphatation step; and a material formed by charring calcium phosphate formed by a phosphatation step.

16. The process of claim 1, wherein the pH of the liquor is adjusted to between about pH 5 and about pH 9.

17. The process of claim 1, wherein the precipitate is formed in a period of no more than about 60 minutes.

18. The process of claim 1, further comprising introducing a surfactant into the liquor.

19. A sugar refining process comprising the process of claim 1.

20. A water decontamination process comprising the process of claim 1.

21. The process of claim 6, wherein the carbon dioxide gas comprises from about 50% up to about 100% carbon dioxide.

22. The process of claim 1, wherein the pH of the liquor is adjusted to between about pH 6 and about pH 8.

23. The process of claim 1, wherein the pH of the liquor is adjusted to between about pH 6.5 and about pH 7.5.

24. The process of claim 1, wherein the pH of the liquor is adjusted to about neutral pH.

25. The process of claim 1, wherein the precipitate is formed in a period of not more than 30 minutes.

26. The process of claim 1, wherein the precipitate is formed in a period of no more than 20 minutes.

27. The process of claim 1, wherein the precipitate is formed in a period of no more than 10 minutes.

28. The process of claim 1, wherein at least 70% of the contaminants contained in the liquor before the process are in the precipitate and thereby removed from the liquor.

* * * * *